United States Patent
Rolf et al.

(10) Patent No.: US 8,027,673 B2
(45) Date of Patent: Sep. 27, 2011

(54) DESENSE WITH ADAPTIVE CONTROL

(75) Inventors: Erik Rolf, Lund (SE); Anders Petersson, Lund (SE); Ola Samuelsson, Lund (SE); Pontus Nelderup, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 861 days.

(21) Appl. No.: 12/025,254

(22) Filed: Feb. 4, 2008

(65) Prior Publication Data

US 2009/0197591 A1 Aug. 6, 2009

(51) Int. Cl.
*H04Q 1/00* (2006.01)
(52) U.S. Cl. .............. 455/425; 455/63.1; 455/67.13; 455/62
(58) Field of Classification Search .......... 455/414.1, 455/419, 420, 432.3, 434, 435, 500, 501, 455/504, 505, 423, 63.1, 62, 67.11, 67.13, 455/67.15, 575.9
See application file for complete search history.

(56) References Cited

U.S. PATENT DOCUMENTS 5,630,224 A 5/1997 Swail

FOREIGN PATENT DOCUMENTS

| EP | 1 413 979 A1 | 4/2004 |
| EP | 1 432 154 A1 | 6/2004 |
| EP | 1 675 287 A1 | 6/2006 |
| WO | WO 01/73956 A2 | 10/2001 |
| WO | WO 2007/099411 A1 | 9/2007 |

OTHER PUBLICATIONS

International Search Report corresponding to PCT/EP2008/058995 mailed Sep. 30, 2008.
Written Opinion of the International Searching Authority corresponding to PCT/EP2008/058995 mailed Sep. 30, 2008.

*Primary Examiner* — Jean Gelin
(74) *Attorney, Agent, or Firm* — Renner, Otto, Boisselle & Sklar, LLP

(57) ABSTRACT

A method and apparatus for reducing degradation in the sensitivity of a receiver in a mobile phone are disclosed. The sensitivity of the receiver in the mobile phone is monitored. When the sensitivity degrades below a predetermined threshold, it is determined which feature of the mobile phone is causing the detected degradation. The operation of the feature is changed to reduce the amount of degradation produced by the feature.

21 Claims, 4 Drawing Sheets

DESENSE WITH ADAPTIVE CONTROL

TECHNICAL FIELD OF THE INVENTION

The present invention relates to call quality on a mobile phone and more particularly to a method and apparatus for reducing degradation in the sensitivity of a receiver in a mobile phone caused by features of the mobile phone.

DESCRIPTION OF RELATED ART

Over the past 20 years the use of mobile devices such as cell phones, personal digital assistants, digital cameras, digital music players, etc. has skyrocketed. In addition, the functions that each mobile device can perform have increased greatly. The previously separate functions of cell phones, digital cameras, PDAs and digital music players can now be found in a single portable electronic device. Thus, these mobile devices are now a part of many people's daily life.

One problem with all of these features being available on a mobile phone is that these features may interfere with the operation of the mobile phone. For example, features in the mobile phone may cause degradation in the sensitivity of the receiver in the mobile phone, so called desense, when used in combination with a connected call. This can lead to bad call quality and in some cases dropped calls.

Thus, there is a need for a method and apparatus for reducing degradation in the sensitivity of a receiver in a mobile phone by features of the mobile phone.

SUMMARY OF THE INVENTION

According to one embodiment of the invention, a method for reducing degradation in the sensitivity of a receiver in a mobile phone is disclosed. The method comprises the steps of: monitoring the sensitivity of the receiver; detecting when the sensitivity degrades below a predetermined threshold; determining which feature of the mobile phone is causing the detected degradation; changing the operation of the feature to reduce the amount of degradation produced by the feature.

According to another embodiment of the invention an apparatus for reducing degradation in the sensitivity of a receiver in a mobile phone is disclosed. The apparatus comprises: a monitor for monitoring the sensitivity of the receiver; a detector for detecting when the sensitivity degrades below a predetermined threshold; a processor for detecting which feature of the mobile phone is causing the detected degradation wherein said processor changes the operation of the feature to reduce the amount of degradation produced by the feature.

According to another embodiment of the invention a computer readable medium storing code for reducing degradation in the sensitivity of a receiver in a mobile phone is disclosed. The code comprises: code for monitoring the sensitivity of the receiver; code for detecting when the sensitivity degrades below a predetermined threshold; code for determining which feature of the mobile phone is causing the detected degradation; code for changing the operation of the feature to reduce the amount of degradation produced by the feature.

Further embodiments of the invention are defined in the dependent claims.

It is an advantage of embodiments of the invention that the sensitivity degradation of the receiver caused by features of the mobile phone can be reduced or eliminated which results in better call quality and fewer dropped calls.

BRIEF DESCRIPTION OF THE DRAWINGS

Further objects, features and advantages of embodiments of the invention will appear from the following detailed description of the invention, reference being made to the accompanying drawings, in which.

DETAILED DESCRIPTION OF EMBODIMENTS

The present invention will now be described in terms of specific, example embodiments. It is to be understood that the invention is not limited to the example embodiments disclosed. It should also be understood that throughout this disclosure, where a process or method is shown or described, steps of the method may be performed in any order or simultaneously, unless it is clear from the context that one step depends on another being performed first. Also drawings and embodiments which illustrate the inventive concepts are not mutually exclusive. Rather each example has been tailored to illustrate a specific concept discussed. In some cases, elements shown in a particular drawing coexist with others shown in a different drawing, but only certain elements or steps are shown for clarity. It should also be pointed out that references made throughout this disclosure to figures and descriptions using terms such as top, bottom, left, right, vertical, horizontal, etc., are used merely for convenience, and refer only to the relative position of features as shown from the perspective of the reader.

Embodiments of the invention will be disclosed herein in the context of a specific type of mobile device, a mobile terminal of the cellular telephone type, which includes imaging functions and communication functions. The communication functions and a communication mode of operation are but examples of terminal functions associated with a terminal mode of operation. The concepts of the invention are not limited to the specific embodiments described. In particular, the concepts can be applied regardless of the display technology, keypad technology, or type of housing used. The particular mobile device or terminal involved may be a personal communication system (PCS) terminal which can include data processing, facsimile, and data communication capabilities. As previously mentioned, the mobile device in which the invention is implemented can encompass personal digital assistants, Internet access devices, organizers and computers.

Figure 1:
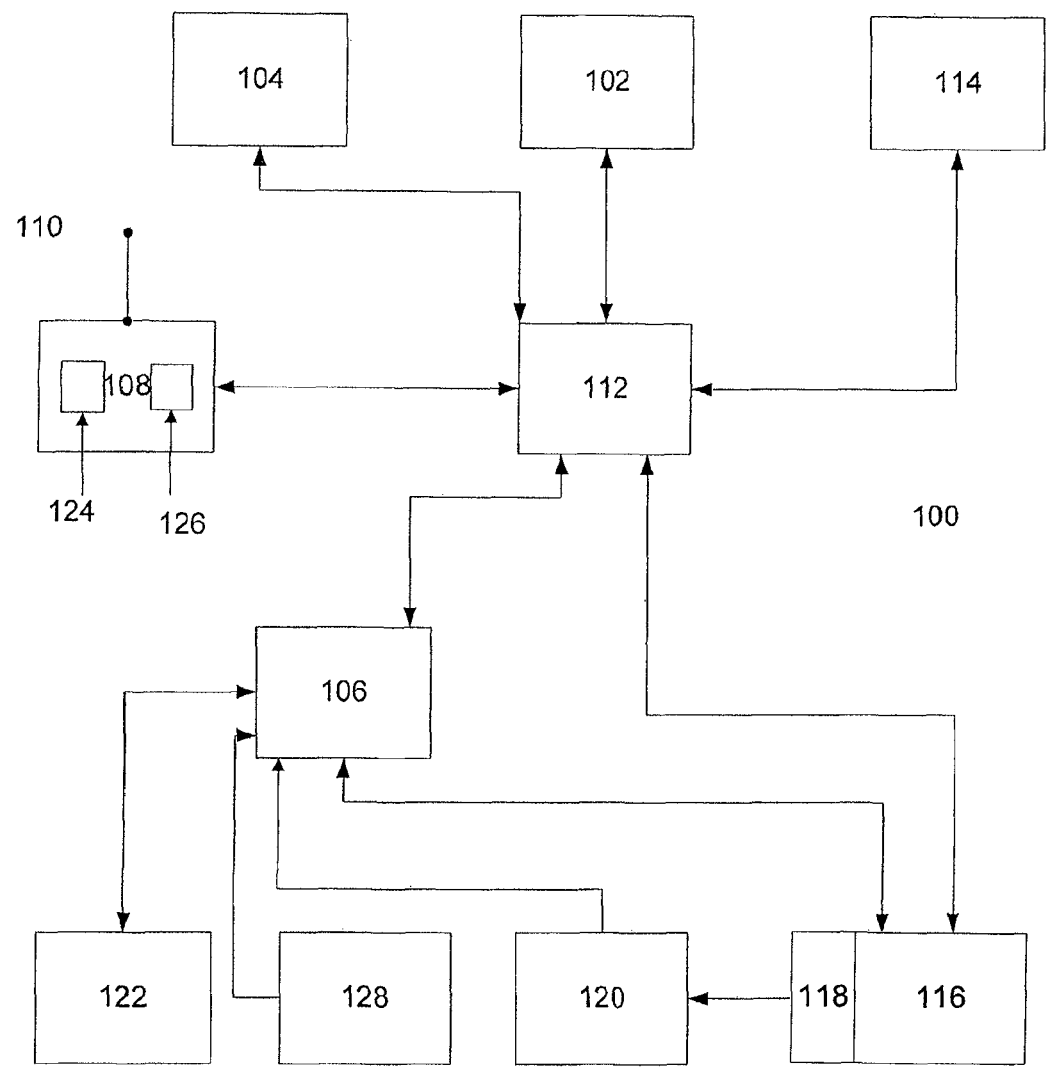
FIG. 1 illustrates a mobile device according to one embodiment of the invention.

FIG. 1 is a functional block diagram of the hardware components of the mobile terminal 100 which can implement some embodiments of the invention. FIG. 1 includes the components which implement the means to carry out at least some of the processes specifically described herein, as well as other functions typically associated with a mobile device of the mobile radio telephone device. Mobile terminal 100 can include a display 102 and an input block 104. These two blocks in conjunction may be used to implement soft keys, otherwise, the input block 104 can include traditional buttons using any technology. The input block 104 may include buttons, soft keys, or touch screen menus. The main processor platform 106 controls the overall operation of the terminal. This platform includes a processor which controls many of the functions of the phone. This platform can also include computer code in the form of firmware, microcode, software, etc. which uses the processor to execute various functions on the terminal. The mobile terminal 100 of FIG. 1 also includes a radio block 108 with a transmitter 124 and a receiver 126 which provides an air interface to a wireless communication network in this example. The terminal's antenna system, 110, is connected to radio block 108. The baseband logic block 112 provides basic signal processing, for example, synchronization, channel coding, decoding, and burst formatting, as is understood in the art. The audio interface block 114 handles voice as well as analog to digital processing. It also receives input through a microphone and produces output through a speaker in the case of a mobile terminal device as is illustrated in this example. The baseband block 112 also performs some of the processing images received through an imaging device, in this example, a camera 116.

The camera 116 may also include a lens cover 118. This lens cover has a built-in switch 120 which reports the status of the lens cover to the main processing platform 106. A lens cover of this type typically slides open on molded or metallic tracks, as is known in the art. The processor 106 can be informed of the status of the lens cover via switch 120, and act accordingly. The mobile terminal 100 also comprises one or more LED's 128 which may be controlled by the main processor platform 106 to perform various functions.

Figure 2:
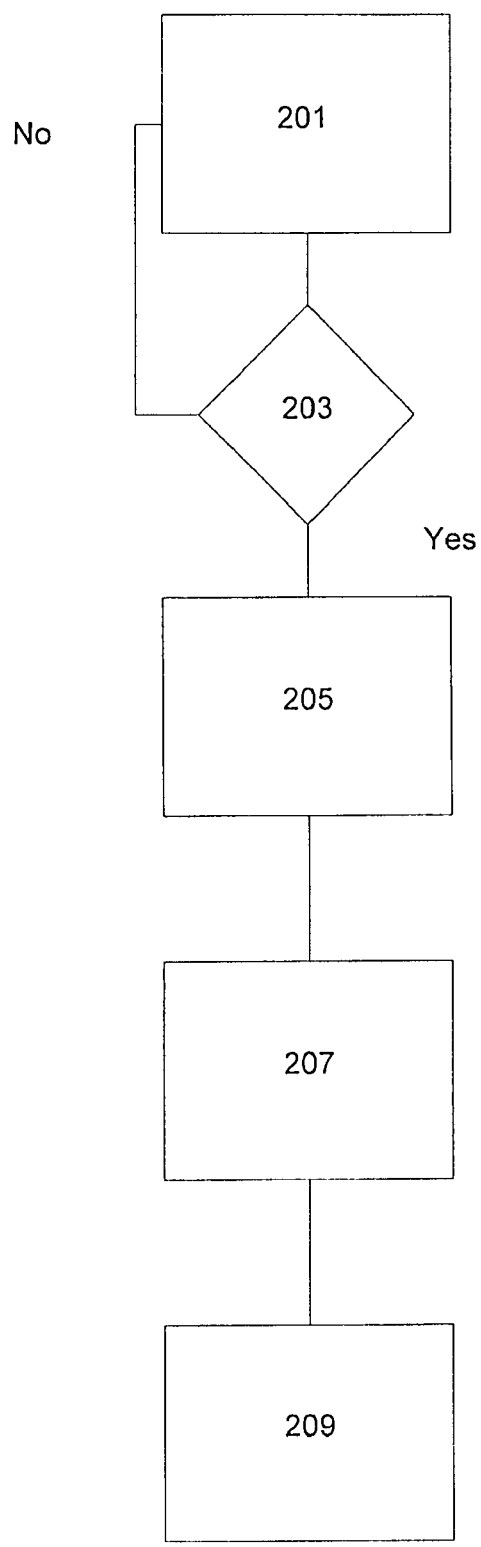
FIG. 2 is a flow chart illustrating the operation of a mobile device according to one embodiment of the invention.

The operation of the mobile device will now be described with reference to FIG. 2 according to one embodiment of the invention. In step 201, the processor 106 monitors the sensitivity or interference levels of the receiver 126. The processor 106 continues to monitor the sensitivity level of the receiver 126 until the sensitivity degrades below a predetermined threshold value in step 203. When the sensitivity degrades below the predetermined threshold value, the processor 106 determines which feature of the mobile phone may be causing the sensitivity degradation in step 205. According to one embodiment of the invention, the processor 106 may either arbitrarily or using a prioritized list, momentarily slow or shut down various features of the mobile phone to determine which feature or features is causing the degradation which will be described in more detail below. For example, the processor 106 changes the operation of the feature to see if the sensitivity degradation improves in step 207. If the sensitivity degradation does not improve with the first change in operation, the processor may change the operation of the feature in a different manner. For example, the processor may first slow down or dim a feature and then shut down the operation of the feature completely. In the alternative, the processor may change the operation of a second feature when changing the operation of the first feature does not improve the degradation in step 209.

Figure 3:
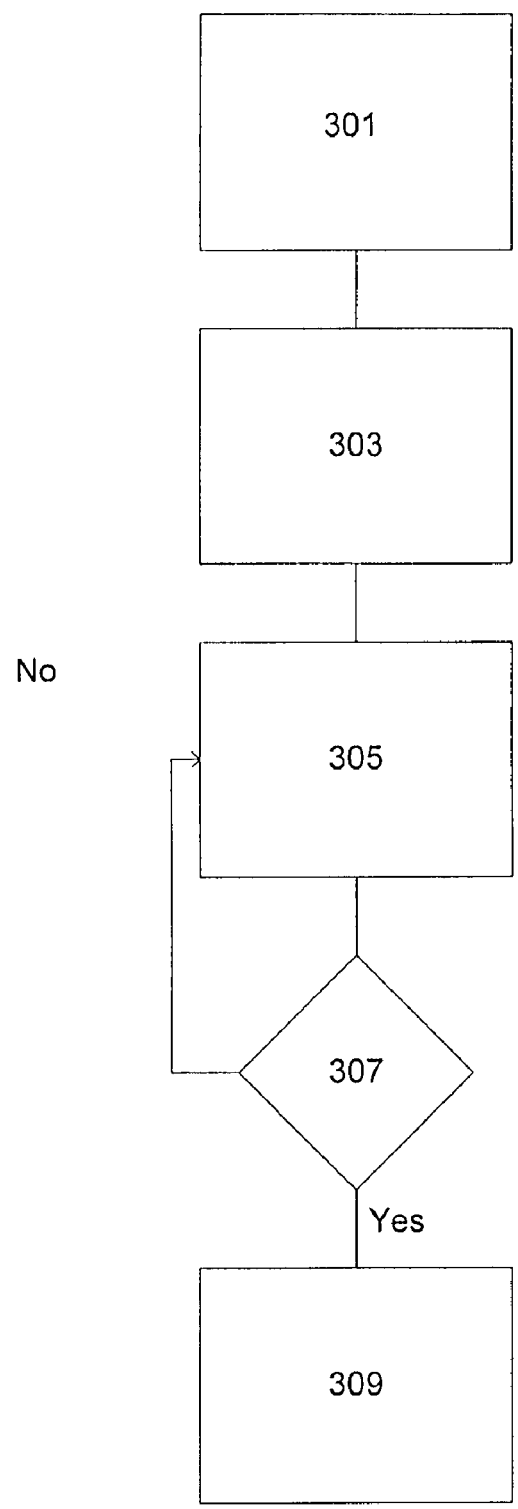
FIG. 3 is a flow chart illustrating a method for determining which feature of the mobile phone is causing the degradation according to one embodiment of the invention.

According to one embodiment of the invention, a method for determining which feature of the mobile phone is causing the interference is disclosed with reference to FIG. 3. As mentioned above, the processor 106 may use a prioritized list of features to determine which features to try first to improve the degradation. Depending on where in the network the mobile phone is operating, the mobile phone will be operating on different frequencies. Different features of the mobile phone will disturb different frequencies. Thus, lists of most likely features of the mobile phone to be causing interference with the call can be calculated and stored in the mobile phone for various frequencies.

According to this embodiment of the invention, the processor 106 first determines what frequency the receiver 126 is using for the call in step 301. The processor 106 then selects a stored list of possible features which may be causing the interference for the determined frequency in step 303. The processor 106 then momentarily changes the operation of the first feature in the list to determine if the degradation is improved to an acceptable level in step 305. As mentioned above, the processor 106 may momentarily slow down or shut down the selected feature. If it is determined in step 307 that the momentary change in operation of the first feature has improved the degradation to an acceptable level, the processor 106 implements the change in operation until the call is completed or until the receiver 126 changes frequencies in step 309.

If it is determined in step 307 that the momentary change to the feature did not change the degradation, the processor 106 may change the operation of the same feature in a more drastic manner, e.g. completely shut down the feature rather than slow down the feature, or select the next feature on the list and momentarily change the operation of that feature. This process continues until the degradation is improved or all of the features on the list have been checked.

The mobile phone may have many features including but not limited to a main display 102, a camera 116, one or more LED's 128, a clock signal to the processor 106, an Internet connection. To determine if the sensitivity degradation of the receiver 126 is coming from the main display 102, the processor 106 may either dim or shut down the main display 102 to determine if either action causes the degradation of the receiver 126 to improve. To determine if the frequency of a clock signal to the processor 106 is causing the sensitivity degradation, the processor 106 may lower the frequency of the clock signal to determine if this action improves the degradation of the receiver 126. To determine if the sensitivity degradation of the receiver 126 is coming from the LED(s) 128 on the mobile phone, the processor 106 may either dim or shut down the LED(s) 128 to determine if either action causes the degradation of the receiver 126 to improve. To determine if an Internet connection is causing the sensitivity degradation of the receiver 126, the processor 106 may disconnect the Internet connection to determine if this action improves the degradation of the receiver 126.

Figure 4:
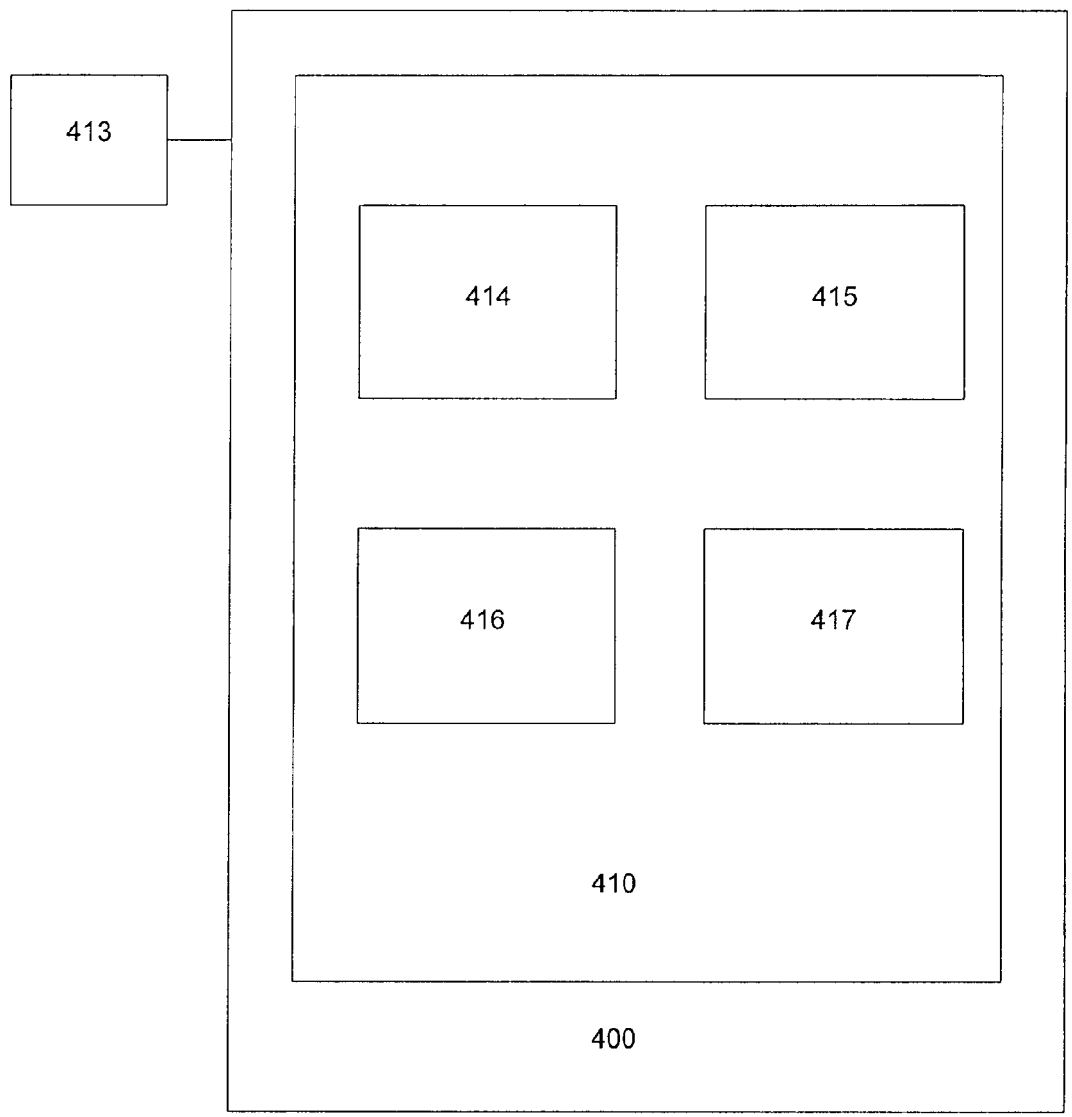
FIG. 4 illustrates a computer readable medium according to one embodiment of the invention.

In another embodiment of the invention according to FIG. 4, a computer-readable medium 400 is illustrated schematically. The computer-readable medium 400 has embodied thereon a computer program 410 for reducing degradation in the sensitivity of a receiver in a mobile phone, for process by a computer 413. The computer program comprises a code segment 414 for monitoring the sensitivity of the receiver; a code segment 415 for detecting when the sensitivity degrades below a predetermined threshold; a code segment 416 for determining which feature of the mobile phone is causing the detected degradation; and a code segment 417 for changing the operation of the feature to reduce the amount of degradation produced by the feature.

The present invention has been described above with reference to specific embodiments. However, other embodiments than the above described are equally possible within the scope of the invention. Different method steps than those described above, performing the method by hardware or software or a combination of hardware and software, may be provided within the scope of the invention. It should be appreciated that the different features and steps of the invention may be combined in other combinations than those described. The scope of the invention is only limited by the appended patent claims.

What is claimed is:

1. A method for reducing degradation in the sensitivity of a receiver in a mobile phone, comprising the steps of: monitoring the sensitivity of the receiver; detecting when the sensitivity degrades below a predetermined threshold; determining which feature of the mobile phone is causing the detected degradation; changing the operation of the feature to reduce the amount of degradation produced by the feature; and wherein the step of determining which feature is causing the detected degradation comprises the steps of:
determining what frequency the receiver is using;
selecting a stored list of probable features causing the interference for the determined frequency;
momentarily changing the operation of each active feature on the stored list to determine if the degradation is improved to an acceptable level when the operation is changed.

2. The method according to claim 1, wherein each stored list is prioritized from most likely to least likely to be causing the degradation at the selected frequency.

3. The method according to claim 1, wherein the operation of each feature is momentarily reduced.

4. The method according to claim 1, wherein the operation of each feature is terminated.

5. The method according to claim 1, wherein when a main display of the mobile phone is the feature causing the degradation, the main display is dimmed to decrease the degradation of the receiver.

6. The method according to claim 1, wherein when a main display of the mobile phone is the feature causing the degradation, the main display is shut down to decrease the degradation of the receiver.

7. The method according to claim 1, wherein when a clock signal to an application processor in the mobile phone is the feature causing the degradation, the frequency of the clock signal to the application processor is lowered to decrease interference from sharp clock signal edges.

8. The method according to claim 1, wherein when a camera in the mobile phone is the feature causing the degradation, the camera is shut down to decrease the degradation of the receiver.

9. The method according to claim 1, wherein when an LED on the mobile phone is the feature causing the degradation, the LED is dimmed to decrease the degradation of the receiver.

10. The method according to claim 1, wherein when an LED on the mobile phone is the feature causing the degradation, the LED is shut off to decrease the degradation of the receiver.

11. An apparatus for reducing degradation in the sensitivity of a receiver in a mobile phone, comprising: a monitor for monitoring the sensitivity of the receiver; a detector for detecting when the sensitivity degrades below a predetermined threshold; a processor for detecting which feature of the mobile phone is causing the detected degradation, wherein said processor changes the operation of the feature to reduce the amount of degradation produced by the feature; and
wherein the processor detects which feature is causing the degradation by:
determining what frequency the receiver is using;
selecting a stored list of probable features causing the interference for the determined frequency;
momentarily changing the operation of each active feature on the stored list to determine if the degradation is improved to an acceptable level when the operation is changed.

12. The apparatus according to claim 11, wherein each stored list is prioritized from most likely to least likely to be causing the degradation at the selected frequency.

13. The apparatus according to claim 11, wherein the operation of each feature is momentarily reduced.

14. The apparatus according to claim 11, wherein the operation of each feature is terminated.

15. The apparatus according to claim 11, wherein when a main display of the mobile phone is the feature causing the degradation, the main display is dimmed to decrease the degradation of the receiver.

16. The apparatus according to claim 11, wherein when a main display of the mobile phone is the feature causing the degradation, the main display is shut down to decrease the degradation of the receiver.

17. The apparatus according to claim 11, wherein when a clock signal to an application processor in the mobile phone is the feature causing the degradation, the frequency of the clock signal to the application processor is lowered to decrease interference from sharp clock signal edges.

18. The apparatus according to claim 11, wherein when a camera in the mobile phone is the feature causing the degradation, the camera is shut down to decrease the degradation of the receiver.

19. The apparatus according to claim 11, wherein when an LED on the mobile phone is the feature causing the degradation, the LED is dimmed to decrease the degradation of the receiver.

20. The apparatus according to claim 11, wherein when an LED on the mobile phone is the feature causing the degradation, the LED is shut off to decrease the degradation of the receiver.

21. A computer readable medium storing code for reducing degradation in the sensitivity of a receiver in a mobile phone, said code comprising:
code for monitoring the sensitivity of the receiver;
code for detecting when the sensitivity degrades below a predetermined threshold;
code for determining which feature of the mobile phone is causing the detected degradation;
code for changing the operation of the feature to reduce the amount of degradation produced by the feature; and
wherein the code for determining which feature of the mobile phone is causing the detected degradation comprises:
code for determining what frequency the receiver is using;
code for selecting a stored list of probable features causing the interference for the determined frequency;
code momentarily changing the operation of each active feature on the stored list to determine if the degradation is improved to an acceptable level when the operation is changed.

* * * * *